United States Patent [19]
Vermilion

[11] Patent Number: 4,828,382
[45] Date of Patent: May 9, 1989

[54] PASSIVE RADIO ALTIMETER
[75] Inventor: Everette E. Vermilion, Seattle, Wash.
[73] Assignee: Sundstrand Data Control, Inc., Redmond, Wash.
[21] Appl. No.: 853,489
[22] Filed: Apr. 18, 1986
[51] Int. Cl.⁴ .......................... G01C 3/00; G01C 3/08
[52] U.S. Cl. ........................................... 356/1; 356/5; 342/120; 342/453; 364/458
[58] Field of Search .................... 356/1, 4, 5; 342/13, 342/120, 135, 452, 453; 364/458

[56] References Cited
U.S. PATENT DOCUMENTS

| | | | |
|---|---|---|---|
| 2,350,820 | 6/1944 | Rettinger | 356/1 |
| 3,203,305 | 8/1965 | Fairbanks | 356/4 |
| 3,242,491 | 3/1966 | Winter | 342/462 |
| 3,320,615 | 5/1967 | Albright et al. | 342/453 |
| 3,863,257 | 1/1975 | Kang et al. | |
| 3,939,476 | 2/1976 | Leopard et al. | |
| 4,288,049 | 9/1981 | Alpers | 244/3.14 |
| 4,370,656 | 1/1983 | Frazier et al. | 342/126 |
| 4,509,049 | 4/1985 | Haendel et al. | |
| 4,558,323 | 12/1985 | Golinsky | |
| 4,572,667 | 2/1986 | Rogers | |
| 4,595,925 | 6/1986 | Hansen | 342/120 |
| 4,635,203 | 1/1987 | Merchant | 364/458 |

Primary Examiner—Stephen C. Buczinski
Assistant Examiner—Linda J. Wallace
Attorney, Agent, or Firm—Michael S. Yatsko; Trevor B. Joike; James A. Wanner

[57] ABSTRACT

A method and apparatus is disclosed for passively determining altitude above the ground of an aircraft by use of an active emitter carried on a second higher altitude aircraft. Specifically, the altitude of the aircraft is determined by measuring the time difference between direct path radiation and reflected path radiation, taking into account the distance between an upper antenna which receives the direct path radiation and a lower antenna which receives the reflected path radiation and the angles of travel relative to the vertical between the direct path radiation and the reflected path radiation.

19 Claims, 2 Drawing Sheets

PASSIVE RADIO ALTIMETER

TECHNICAL FIELD

This invention relates to the general subject of aircraft instrumentation or avionics. In particular, it is an invention for an altimeter which uses radio signals transmitted from another airborne platform or location to measure height above the ground.

BACKGROUND OF THE INVENTION

The altitude of airplanes and other aircraft has traditionally been determined by means of an instrument based on a barometer. This is the so-called barometric altimeter. Although such altimeters have been widely used, they have their shortcomings. For example, they should be corrected for atmospheric pressure variations due to weather changes and measure height above mean sea level not height above the ground.

A radio altimeter is an altimeter which uses electromagnetic radiation to determine the altitude of the aircraft. Such an altimeter depends upon the time difference between the transmission of a radio signal and the reflected signal. U.S. Pat. No. 2,020,347 describes an early device. A radar altimeter is still another type of altimeter (see U.S. Pat. No. 3,543,270). Conventional radio altimeters generate signals at approximately 4.3 gigahertz (GHz). Although the radio altimeter or radar altimeter have advantages over the barometric altimeter, they cannot be used under all circumstances.

In particular, during aircraft missions over unfriendly terrain, it is often necessary to prevent detection of the aircraft by securing all sources of radio energy. Thus, radio transmitters, radars and radio altimeters are turned off to prevent the enemy from using their emissions for detection and weapons homing. Although barometric altimeters can be used under these circumstances, they do not have the desired degree of accuracy and responsiveness needed for such missions. They do not measure height above the ground.

Thus, it would be highly desirable for a means to be found to provide the advantages of a radio or radar altimeter, while not producing emissions which can result in the aircraft being detected. In effect, there is a need for a passive radio altimeter. Passive ranging devices are not unknown to the art. U.S. Pat. No. 4,130,360 teaches a laser altimeter. U.S. Pat. No. 4,558,323 describes a method of passive measurement of range, velocity and the course of a target relative to a test aircraft. However, the subject of passive altitude measurement has been neglected.

Clearly, a method and apparatus which would allow one to passively determine the altitude of one's own aircraft above the ground with the degree of accuracy expected from a radio altimeter would solve a difficult problem and satisfy a need long felt by military and commercial aviation.

SUMMARY OF THE INVENTION

In accordance with the present invention, an apparatus and method is disclosed for measuring the altitude of an aircraft without that aircraft having to emit electromagnetic energy. Specifically, the altitude of one aircraft is passively determined by using the electromagnetic radiation emitted by a second aircraft which is located at an altitude higher than the first aircraft. In particular, the higher altitude aircraft is provided with a source of electromagnetic radiation directed towards the earth and in the general direction of the second or passive aircraft, and the second aircraft is provided with a means for receiving the electromagnetic radiation emitted directly from the first aircraft and a means for receiving the radiation emitted from the first aircraft and reflected from the earth's surface. By observing the time difference between the receipt of the direct path signal, the reflected signal and the angle at which the two signals are received, the altitude of the passive aircraft can be calculated.

In one embodiment, the lower aircraft is provided with an antenna on the upper part of the aircraft's body or hull and another antenna on the lower part of the aircraft. Each antenna is of the type which produces an output signal which can be used to calculate the angle of incidence of the received electromagnetic energy. In one very specific embodiment, the higher altitude aircraft is located vertically above the lower aircraft, such that the angle at which the direct radiation and reflected radiation are received is essentially zero degrees. This situation simplifies the calculation of altitude. Other advantages and features of the present invention will become readily apparent form the detailed description of the invention, the embodiments presented, the accompanying drawings and the claims.

DETAILED DESCRIPTION

Figure 1:
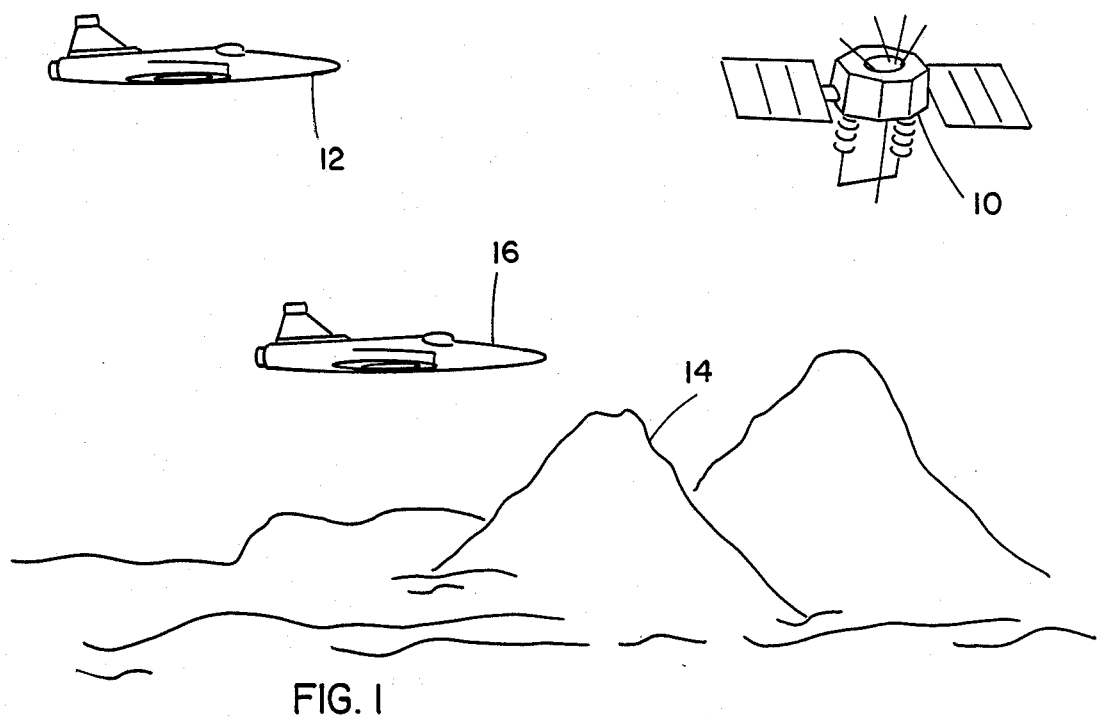
FIG. 1 is a pictorial representation of the environment under which the present invention may be used.

While this invention is susceptible of embodiment in many different forms, there is shown in the drawings and will herein be described in detail, one specific embodiment, with the understanding that the present disclosure is to be considered an exemplification of the principles of the invention and is not intended to limit the invention to the specific embodiment illustrated.

Turning to FIG. 1, there is shown two aircraft and a satellite positioned above the surface of the earth. Specifically, there is illustrated a satellite 10 in earth orbit, an aircraft 12 disposed at a high altitude relative to the surface of the earth 14, and a second aircraft 16 disposed between the first aircraft and the earth's surface. This second aircraft 16 will be referred to as the passive aircraft or platform since that aircraft will not transmit any electromagnetic radiation for purposes of altitude determination. The higher located aircraft 12 or the satellite 10 will be referred to as the active aircraft or active platform, inasmuch as it will be a source of electromagnetic radiation to determine the altitude of the passive aircraft 16.

The utility of a passive apparatus for determining altitude of an aircraft with the degree of accuracy expected from a radio altimeter can be best understood from the following examples. There are many times during military operations in which an aircraft will penetrate an enemy's defenses by flying in at extremely low altitude or "tree-top" level. An aircraft, flying at such a low altitude, is more likely to pass beneath the search path of conventional land based radar systems. As can be expected, when a aircraft flies at low altitude, particularly at high speed, the determination of altitude is of extreme importance to the pilot. More often than not, the aircraft can only be operated at a high speed at low altitude if an automatic system is used to control the aircraft in response to the altitude of the aircraft. In other words, an altimeter, with a high degree of accuracy, such as that found in a radio or radar altimeter, is extremely important to the success of such an operation. Similarly, it is often desirable to fly a missile, such as a cruise missile, at a very low altitude, such as just above the surface of the ocean, to enable that missile to penetrate defenses and remain undetected until target impact. While infrared terminal guidance may be used, that guidance does not provide high accuracy altitude information. Finally, there are occasions when the installed equipment must be kept to a minimum, when secondary or back-up radio altimeters are too costly to install, or when complete redundancy cannot be justified. Thus, an alternative radio altimeter that is accurate and inexpensive must be found to improve the probability of a successful mission.

Figure 2:
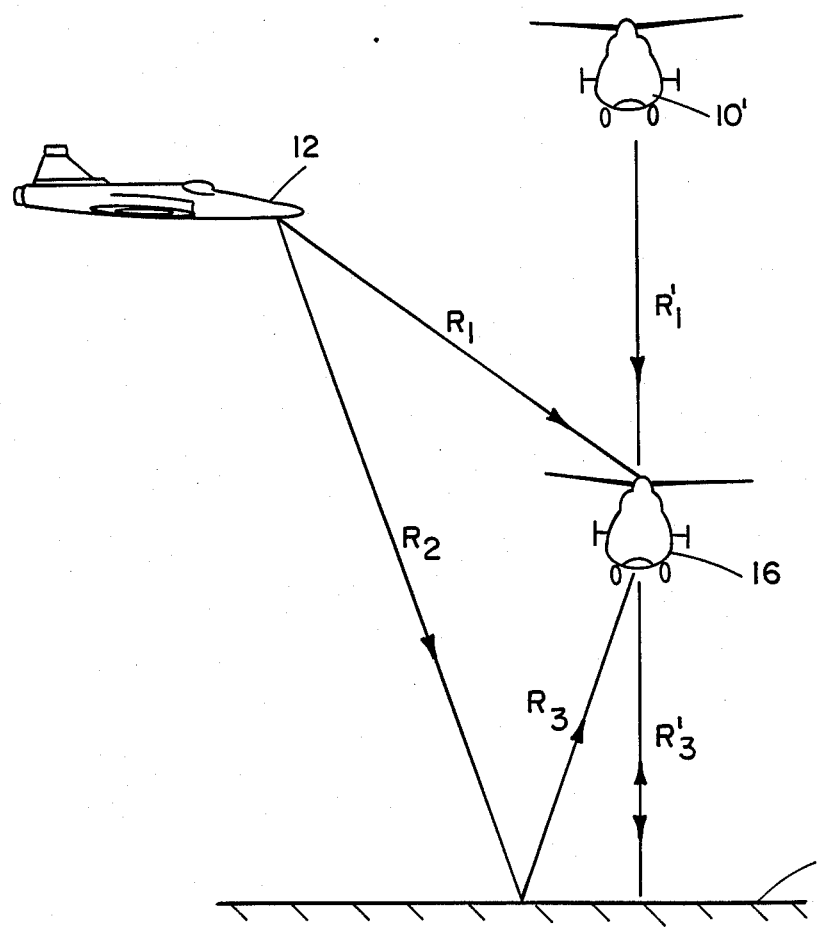
FIG. 2 is a drawing showing the general relationship of two aircraft which carry the apparatus that is the subject of the invention.

Turning to FIG. 2, two helicopters 10' and 16 are shown disposed vertically above the surface of the earth 14. The utility of such an arrangement, where one aircraft is directly above the other, will become apparent from the discussion which follows. Also shown, for purpose of generality, is a third aircraft 12 depicted as a fixed wing aircraft. Although only one active and one passive aircraft or other airborne platform are needed, a plurality of aircraft disposed at different altitudes may be used for altitude comparison purposes. Similarly, different emitters may be used at different points in the mission. For that matter, as will become more clear from the explanation which follows, the higher altitude platform may be a geosynchronous or other satellite (see FIG. 1) and laser radiation may be used instead of a radio or radar transmission.

Figure 3:
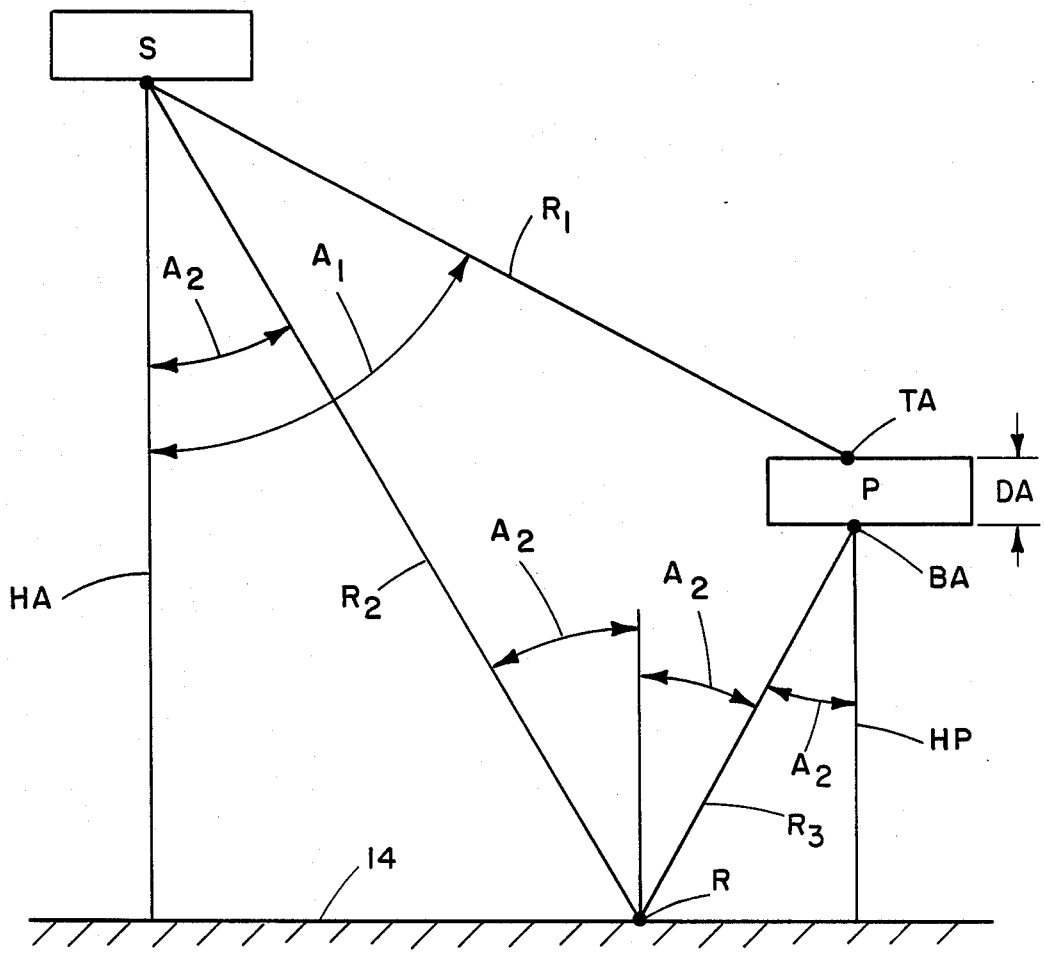
FIG. 3 is a drawing showing the geometry of the altitude computation.

Turning now to FIG. 3, there is depicted a source S of radio frequency energy emitted from a platform disposed above a lower altitude platform P using the passive radio altimeter (PRA) that is the subject of the present invention. The aircraft P with the PRA has antennae on the top TA and bottom BA of the aircraft. By measuring the time between the signal arrival at the top antenna TA and the signal arrived at the bottom antenna BA of the aircraft P, the altitude of the aircraft can be calculated. Generally speaking, this calculation is similar to that performed by conventional radio altimeters where the aircraft has both a transmitting antenna and receiving antenna generally located at the bottom of the aircraft and horizontally separated from each other. (See U.S. Pat. No. 3,364,485.) As shown in the drawings, R1 represents the direct distance between the source S and the top antenna TA; R2 represents the distance between the source S and the point of reflection R on the earth's surface 14; R3 represents the distance from the point of reflection R on the earth's surface 14 to the bottom antenna BA; A1 is the angle from the vertical to the direct path between the two aircraft; A2 is the angle from the vertical to the path of the reflected radiation; DA is the vertical distance between the two antennas TA and BA on the passive aircraft P; HA is the altitude of the active aircraft S; and HP is the altitude of the passive aircraft P.

Now, if T1 is the time of travel from the active aircraft S to the top antenna TA; T2 is the time of travel from the active aircraft S to the point of reflection R on the earth's surface 14; and T3 is the time of travel from the point of reflection R to the bottom antenna BA, then the time difference is:

$$DT = T2 + T3 - T1$$

since distance equals rate multiplied by time:

$$C\ t1 = R1$$

$$C\ T2 = R2$$

$$C\ T3 = R3$$

where C is the speed of light, or:

$$C\ DT = R2 + R3 - R1$$

By inspection, it can be shown that:

$$HP = C/2\ [(T2 + T3) \cos A2 - T1 \cos A1]$$

Now, when the two aircraft are essentially vertically disposed above each other, A2=A1. Therefore:

$$HP = 0.5\ C\ DT \cos A1$$

and if A1 and A2 are small, $$HP = 0.5\ C\ DT$$

where we have also assumed that DA is approximately "0", considering the distances HA and HP. If that assumption is not made, then:

$$HP = 0.5\ DT\ C - DA.$$

In any event, by measuring the angle of arrival at TA and BA, a more exact determination of altitude can be made. Radio altimeter antennas suitable for use in the 4–5 gigahertz (GHz) range can be obtained from Ball Aerospace. Such an antenna has an accuracy of approximately 5 degrees and has a physical size of approximately $3 \times 3 \times 1/16$ inches.

From the foregoing, it will be observed that numerous variations and modifications may be effected without departing from the true spirit and scope of the novel concept of the invention. For example, although the invention has been described in detail in the specific environment of the measurement of altitude relative to the surface of the earth, the basic principles of the invention are equally applicable to the measurement of range to another fixed object from which electromagnetic radiation may be reflected (i.e., a space station with the passive platform being an astronaut). Similarly, other forms of radiation which are reflected may be used, including lasers and visible light. In addition, the invention has utility in the field of ground proximity warning systems wherein those systems often employ a radio altimeter in conjunction with a barometric altimeter. Finally, the passive ranging technique described may be used to cross reference, cross check or otherwise verify the accuracy and performance of other altitude measuring means. Thus, it should be understood that no limitation with respect to the specific apparatus illustrated herein is intended or should be inferred. It is, of course, intended to cover, by the appended claims, all such modifications as fall within the scope of the claims.

I claim:

1. A system for passively determining the altitude of a first platform using a source of electromagnetic radiation directed towards the earth from a second platform disposed at an altitude above the earth higher than the first platform comprising:
   (a) upper means, on the first platform, for receiving radiation directly from the source;
   (b) lower means, on the first platform, for receiving radiation from the source and reflected from the earth's surface; and
   (c) computer means, on the first platform, for calculating the altitude of the first platform using the time arrival characteristics of the radiation at said upper means and said lower means and without requiring the use of distance measurements between said first platform and said source.

2. The apparatus of claim 1, wherein said source of radiation is a satellite.

3. The apparatus of claim 2, wherein said satellite is in geosynchronous orbit.

4. The apparatus of claim 1, wherein said source of radiation is a source of laser radiation.

5. The apparatus of claim 1, wherein said source of radiation is disposed in a helicopter hovering above the earth's surface.

6. The apparatus of claim 1, wherein said upper means and said lower means are essentially disposed at the same altitude above the earth's surface.

7. The apparatus of claim 1, wherein said computer means uses an algorithm which uses the difference between the time of arrival of radiation at said upper means and the time of arrival at said lower means.

8. The apparatus of claim 7, wherein said computer means uses an algorithm which uses the angle of arrival of radiation at said upper means relative to a vertical reference line.

9. The apparatus of claim 1, wherein said computer means uses an algorithm such that the altitude of the first platform is directly proportional to the time difference between the time of arrival of said radiation at said upper means and the time of arrival of said radiation at said lower means.

10. The apparatus of claim 1, wherein said first platform is an aircraft and further including:
    (a) means for determining the barometric altitude of said aircraft;
    (b) means for determining the rate of change of the barometric altitude of the aircraft; and
    (c) warning means for providing a warning signal in the event that the rate of change of barometric altitude is excessive for the altitude of the aircraft.

11. A method for passively determining the altitude of an aircraft, comprising the steps of:
    (a) locating a source of radiation at an altitude higher than that of the aircraft;
    (b) measuring on the aircraft the time that it takes for the radiation to travel between said source and the aircraft;
    (c) measuring on the aircraft the time that it takes for the radiation to travel from said source to the aircraft after being reflected by the surface of the earth; and
    (d) multiplying the difference between said two time measurements by the velocity of light and dividing the product by two to compute the altitude without requiring the determination of the distance between the source and the aircraft.

12. The method of claim 11, further including the steps of:
    (a) measuring on the aircraft the angle from the vertical to the path of radiation from the source to the direct path of radiation to the aircraft; and
    (b) multiplying the altitude obtained in step (d) by the cosine of said angle.

13. The method of claim 11, wherein the aircraft includes an upper signal receiver and a lower signal receiver vertically disposed above each other; and further including the step of measuring the distance between the two signal receivers and correcting the altitude obtained in step (d) by the distance between said upper signal receiver and said lower signal receiver.

14. The method of claim 11, including positioning said source directly vertically above the aircraft such that the paths of the direct radiation and reflected radiation are essentially vertical.

15. The method of claim 13, including locating the two signal receivers so that the vertical distance between the two signal receivers relative to the altitude of said source is such that the vertical distance between the two antennas need not be considered.

16. The method of claim 11, wherein said source of radiation is disposed away from the vertical and including calculating the altitude of the aircraft using the formula:

$$0.5\ C\ (T2+T3)\cos A2 - 0.5\ C\ T1 \cos A1$$

where C is the velocity of light, T2+T3 is time of travel of the reflected path radiation, T1 is the time of travel of the direct path radiation, A2 is the angle of the reflected path relative to the vertical, and A1 is the angle of direct path relative to the vertical.

17. The method of claim 11 further including positioning a second source of radiation at an altitude between said aircraft and the first source;
    repeating steps (a) through (d) using each source of radiation; and
    cross-comparing the two computations of altitude.

18. The method of claim 11, including positioning said source stationary relative to the surface of the earth.

19. A method for passively determining the altitude of an aircraft, comprising the steps of:
    (a) locating a source of microwave radiation generally vertically above the aircraft and at a distance which is substantially higher than the altitude of the aircraft and which is substantially greater than the diameter of the fuselage of the aircraft;
    (b) measuring on the aircraft the time that it takes for said radiation to travel between said source and the aircraft;
    (c) measuring on the aircraft the time that it takes for said radiation to travel from said source to the aircraft after being reflected by the surface of the earth; and
    (d) multiplying the difference between said two time measurements by the velocity of light and dividing the product by two to obtain the altitude without requiring knowing the distance between the source and the aircraft.

* * * * *